US012785244B2

(12) United States Patent
Cho et al.

(10) Patent No.: US 12,785,244 B2
(45) Date of Patent: Nov. 3, 2026

(54) TRANSPARENT ANTENNA MODULE AND METHOD FOR MANUFACTURING SAME

(71) Applicant: LG ELECTRONICS INC., Seoul (KR)

(72) Inventors: Seongmoon Cho, Seoul (KR); Dongjoo You, Seoul (KR); Jeayoul Joung, Seoul (KR); Junseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 18/709,296

(22) PCT Filed: Nov. 11, 2021

(86) PCT No.: PCT/KR2021/016448

§ 371 (c)(1),
(2) Date: Oct. 18, 2024

(87) PCT Pub. No.: WO2023/085461

PCT Pub. Date: May 19, 2023

(65) Prior Publication Data

US 2025/0343344 A1 Nov. 6, 2025

(51) Int. Cl.
*H01Q 1/12* (2006.01)
*H01Q 1/48* (2006.01)

(52) U.S. Cl.
CPC .............. *H01Q 1/1271* (2013.01); *H01Q 1/48* (2013.01)

(58) Field of Classification Search
CPC .......... H01Q 1/1271; H01Q 1/48; H01Q 1/24; H01Q 1/38; H01Q 9/0407; H01Q 1/22
See application file for complete search history.

(56) References Cited

U.S. PATENT DOCUMENTS

2015/0313008 A1 10/2015 Spath et al.
2020/0211951 A1 7/2020 Daitoku et al.
2021/0121968 A1* 4/2021 Farreyrol .............. H01R 4/625
(Continued)

FOREIGN PATENT DOCUMENTS

KR 1020090092278 8/2009
KR 10-2019-0071411 6/2019
KR 102041690 11/2019
(Continued)

OTHER PUBLICATIONS

European Patent Office Application Serial No. 21964171.9, Search Report dated Jul. 15, 2025, 10 pages.
(Continued)

*Primary Examiner* — Seung H Lee
(74) *Attorney, Agent, or Firm* — LEE, HONG, DEGERMAN, KANG & WAIMEY

(57) ABSTRACT

A transparent antenna module according to the present specification comprises: a dielectric substrate; dielectric structures formed on and in contact with the dielectric substrate and formed to be spaced a gap area having a predetermined distance apart from each other in at least one axial direction; a first conductive layer formed in the gap area to be in contact with the dielectric substrate and formed to have a first thickness; and a second conductive layer formed on and in contact with the first conductive layer and formed to have a second thickness.

18 Claims, 13 Drawing Sheets

(56) References Cited

U.S. PATENT DOCUMENTS

2023/0253708 A1 * 8/2023 Take ...................... H05K 3/244
343/897

FOREIGN PATENT DOCUMENTS

| | | |
|---|---|---|
| KR | 1020210127390 | 10/2021 |
| WO | 2020226049 | 11/2020 |
| WO | 2021206177 | 10/2021 |

OTHER PUBLICATIONS

PCT International Application No. PCT/KR2021/016448, International Search Report dated Aug. 10, 2022, 9 pages.

PCT International Application No. PCT/KR2021/016448, International Search Report dated Aug. 10, 1 2022, 9 pages.

Korean Intellectual Property Office Application No. 10-2024-7009417, Office Action dated Oct. 28, 2025, 5 pages.

* cited by examiner

TRANSPARENT ANTENNA MODULE AND METHOD FOR MANUFACTURING SAME

CROSS-REFERENCE TO RELATED APPLICATION

This application is the National Stage filing under 35 U.S.C. 371 of International Application No. PCT/KR2021/016448, filed on Nov. 11, 2021, the contents of which are hereby incorporated by reference herein its entirety.

TECHNICAL FIELD

The present disclosure relates to a transparent antenna module. One more particular implementation relates to a transparent antenna module mounted on a display, and a method for manufacturing the same.

BACKGROUND ART

In a method of manufacturing metal electrodes, an imprinting process has been in the spotlight as a process achieving low manufacturing costs and excellent mass productivity. However, this imprint process has high electrical resistance, which limits its usability.

In particular, metal electrodes used in high-frequency communication components containing conductors have low sheet resistance to reduce signal loss, and require for high transparent electrodes to increase design freedom. However, although it is possible to form a metal mesh pattern through the imprint process, there is a limitation in realizing a line width that satisfies both desired sheet resistance value and light transmittance.

Specifically, conductive metal particles may be formed by forming a microchannel on a substrate, filling the microchannel with conductive metal ink, and thermally treating the conductive metal ink. Additionally, plating may be applied to ensure smooth contact between conductive particles. By repeating these processes, a fine conductive pattern formed of multi-layered conductive particles, that is, a plating layer, may be produced.

In this regard, the conductive metal ink or paste used to form a conductor by a printing process has lower conductivity than an original metal. This is because the ink or paste contains organic substances along with metal particles, which makes the contact between metal particles incomplete and thereby forms less conduction paths.

As another example, a method of filling a substrate with conductive metal paste to form a conductive grid pattern may be considered. In this regard, the metal paste has the form of particles, nanowires, or nanorods and may be manufactured with a graphene composite to improve conductivity.

In this regard, conductive metal paste or ink contains an organic binder and an organic compound in a metal component. Accordingly, regardless of whether the shape of a metal material after sintering is spherical (particles) or linear (wire or rod), there is a problem of contact imperfection at an interface. This causes a reduction of conduction paths, thereby increasing resistance. The manufacturing method with the graphene composite to improve the conductivity additionally includes a process of growing metal particles on the surface of the graphene and a process of forming a graphene composite on a substrate. This makes processes complicated and the price expensive.

DISCLOSURE OF INVENTION

Technical Problem

The present disclosure is directed to solving those problems and other drawbacks. Another aspect of the present disclosure is to provide a transparent antenna module mounted on a display, and a method for manufacturing the same.

Still another aspect of the present disclosure is to provide an imprinting method and a metal mesh structure that lower a sheet resistance value during a metal mesh manufacturing process by an imprinting process.

Another aspect of the present disclosure is to implement an antenna radiator as a transparent antenna module with a metal mesh structure according to an imprinting process that lowers a sheet resistance value.

Another aspect of the present disclosure is to implement desired sheet resistance value and transparency by considering resistivity of an electrode material to be used, a line width of a mesh pattern, a thickness of a mesh pattern, a spacing between patterns, and the like.

Another aspect of the present disclosure is to implement a transparent antenna module that maintains transparency with improved conductivity.

Another aspect of the present disclosure is to provide a metal mesh structure that is capable of maintaining or improving antenna characteristics while improving transparency and visibility in a metal mesh line structure.

Solution to Problem

In order to achieve the above aspects and other advantages, there is provided a transparent antenna module that includes: a dielectric substrate; dielectric structures that are formed in contact with an upper portion of the dielectric substrate and spaced apart from each other by a gap region of a predetermined gap in at least one axial direction; a first conductive layer that is formed in the gap region to be in contact with the dielectric substrate and formed to have a first thickness: and a second conductive layer that is formed to be in contact with an upper portion of the first conductive layer and formed to have a second thickness.

According to an embodiment, a transparent metal mesh pattern that includes the first conductive layer and the second conductive layer and is formed in at least one axial direction radiates wireless signals.

According to an embodiment, the dielectric structures may be made of UV resin disposed in contact with the upper portion of the dielectric substrate. The dielectric structures may be formed by stamping the UV resin by use of an imprint mold to be spaced apart from each other by the gap region of the predetermined gap.

According to an embodiment, the first conductive layer may be formed by printing metal ink or metal paste in the gap region to have the first thickness smaller than a height of the dielectric structure.

According to an embodiment, the second conductive layer may be formed on the printed metal ink or metal paste of the first conductive layer through a plating process to have the second thickness. The second conductive layer may operate as a main connection path for the wireless signals.

According to an embodiment, a difference between an entire height of a conductive layer corresponding to a sum of the first thickness of the first conductive layer and the second thickness of the second conductive layer and a height of the dielectric structure may be within a predetermined range.

According to an embodiment, the second thickness of the second conductive layer may be thicker than the first thickness of the first conductive layer. Accordingly, sheet resistance of the wireless signals can be reduced to decrease loss of the transparent metal mesh pattern.

According to an embodiment, the dielectric structure may be formed to be inclined at an angle of 45 degrees or less with respect to a vertical axis. Accordingly, a width of the gap region may decrease toward the dielectric substrate.

According to an embodiment, the first conductive layer may be formed in a hexahedral shape with an inverted trapezoidal cross-sectional area such that an area of an upper region thereof is larger than an area of a lower region. The second conductive layer may be formed in a hexahedral shape with an inverted trapezoidal cross-sectional area such that an area of an upper region thereof is larger than an area of a lower region.

According to an embodiment, the dielectric structure may be formed such that a thickness thereof is greater than a width of the gap region.

The first thickness of the first conductive layer may be greater than a width of the first conductive layer. Accordingly, sheet resistance can be reduced while increasing transmittance of the antenna element configured as the transparent metal mesh pattern.

According to an embodiment, the first conductive layer may be formed by volatilizing organic components of metal ink or metal paste through a heat treatment process. The dielectric structure may be formed of photocurable resin to suppress damage due to the heat treatment process.

According to an embodiment, the second conductive layer may be formed on the first conductive layer through a plating process. A metal content of the second conductive layer may be set to be higher than a metal content of the first conductive layer. Accordingly, conductivity of the second conductive layer may be higher than that of the first conductive layer.

According to an embodiment, the transparent antenna module may further include an antenna element configured as the transparent metal mesh patterns that are disposed at first and second spacings in first and second axial directions to radiate wireless signals. A length of the antenna element may be equal to or set to ½ to ¼ of an operating wavelength corresponding to an operating frequency.

According to an embodiment, the transparent antenna module may further include a feed line that is configured to be connected to the antenna element to apply wireless signals to the antenna element. The feed line and the antenna element may be configured as metal mesh lines each including the first conductive layer and the second conductive layer. The first and second spacings in the first and second axial directions of the metal mesh lines, constituting the feed line and the antenna element, may be set to be the same.

According to an embodiment, the transparent antenna module may further include a terminal part that is configured to be connected to the feed line. A line width of a metal mesh pattern of the terminal part may be set to be wider than a line width of a metal mesh pattern of the antenna element. A third spacing and a fourth spacing in the first axial direction and the second axial direction of the metal mesh patterns of the terminal part may be set to be narrower than the first spacing and the second spacing of the metal mesh patterns of the antenna element.

According to an embodiment, an imprint process may be performed to form a first gap region and a second gap region on front and rear surfaces of the dielectric substrate. The transparent antenna module may further include a first ground layer that is formed in a gap region formed on the rear surface of the dielectric substrate to be in contact with the dielectric substrate and formed to have a first thickness, and a second ground layer that is formed in the gap region formed on the rear surface to be in contact with the first ground layer and is formed to have a second thickness.

According to another aspect of the present disclosure, there is provided with a method for manufacturing a transparent antenna module that includes: a dielectric structure forming step of forming a dielectric structure to be in contact with an upper portion of a dielectric substrate: an imprinting step of forming the dielectric structures using an imprint mold to be spaced apart from each other by a gap region of a predetermined spacing in at least one axial direction: a first conductive layer forming step of forming a first conductive layer in the gap region to be in contact with the dielectric substrate to have a first thickness; and a second conductive layer forming step of forming a second conductive layer to be in contact with an upper portion of the first conductive layer to have a second thickness.

According to an embodiment, an antenna element may be formed as a transparent metal mesh pattern in at least one axial direction through the first conductive layer forming step and the second conductive layer forming step.

According to an embodiment, in the first conductive layer forming step, the first conductive layer may be formed by printing metal ink or metal paste in the gap region to have the first thickness smaller than a height of the dielectric structure. In the second conductive layer forming step, the second conductive layer may be formed by the second thickness on the printed metal ink or metal paste of the first conductive layer through a plating process. The second conductive layer may operate as a main connection path for wireless signals radiated through the antenna element.

According to an embodiment, in the dielectric structure forming step, the dielectric structure may be formed to be inclined at an angle of 45 degrees or less with respect to a vertical axis, so that a width of the gap region decreases toward the dielectric substrate. In the first conductive layer forming step, the first conductive layer may be formed in a hexahedral shape with an inverted trapezoidal cross-sectional area such that an area of an upper region is larger than an area of a lower region. In the second conductive layer forming step, the second conductive layer may be formed in a hexahedral shape with an inverted trapezoidal cross-sectional area such that an area of an upper region is greater than an area of a lower region.

According to an embodiment, in the imprinting step, an imprinting operation may be performed to form gap regions on front and rear surfaces of the dielectric substrate.

The method may further include a first ground layer forming step of forming a first ground layer in a gap region formed on the rear surface of the dielectric substrate to be in contact with the dielectric substrate and have a first thickness.

The method may further include a second ground layer forming step of forming a second ground layer in the gap region formed on the rear surface to be in contact with the first ground layer and have a second thickness.

Advantageous Effects of Invention

Hereinafter, technical effects of a transparent antenna module and a method for manufacturing the same according to the present disclosure will be described.

According to the present disclosure, a transparent antenna module mounted on a display, and a method for manufacturing the same can be provided.

According to the present disclosure, an imprinting method and a metal mesh structure that lower a sheet resistance value during a metal mesh manufacturing process by an imprinting process can be provided.

According to the present disclosure, an antenna radiator can be implemented as a transparent antenna module with a metal mesh structure according to an imprinting process that lowers a sheet resistance value.

According to the present disclosure, desired sheet resistance value and transparency can be achieved by considering resistivity of an electrode material to be used, a line width of a mesh pattern, a thickness of a mesh pattern, a spacing between patterns, and the like.

According to the present disclosure, a transparent antenna module that maintains transparency while improving conductivity can be implemented.

According to the present disclosure, a metal mesh structure that is capable of maintaining or improving antenna characteristics while improving transparency and visibility in a metal mesh line structure can be provided.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

MODE FOR THE INVENTION

Figure 1:
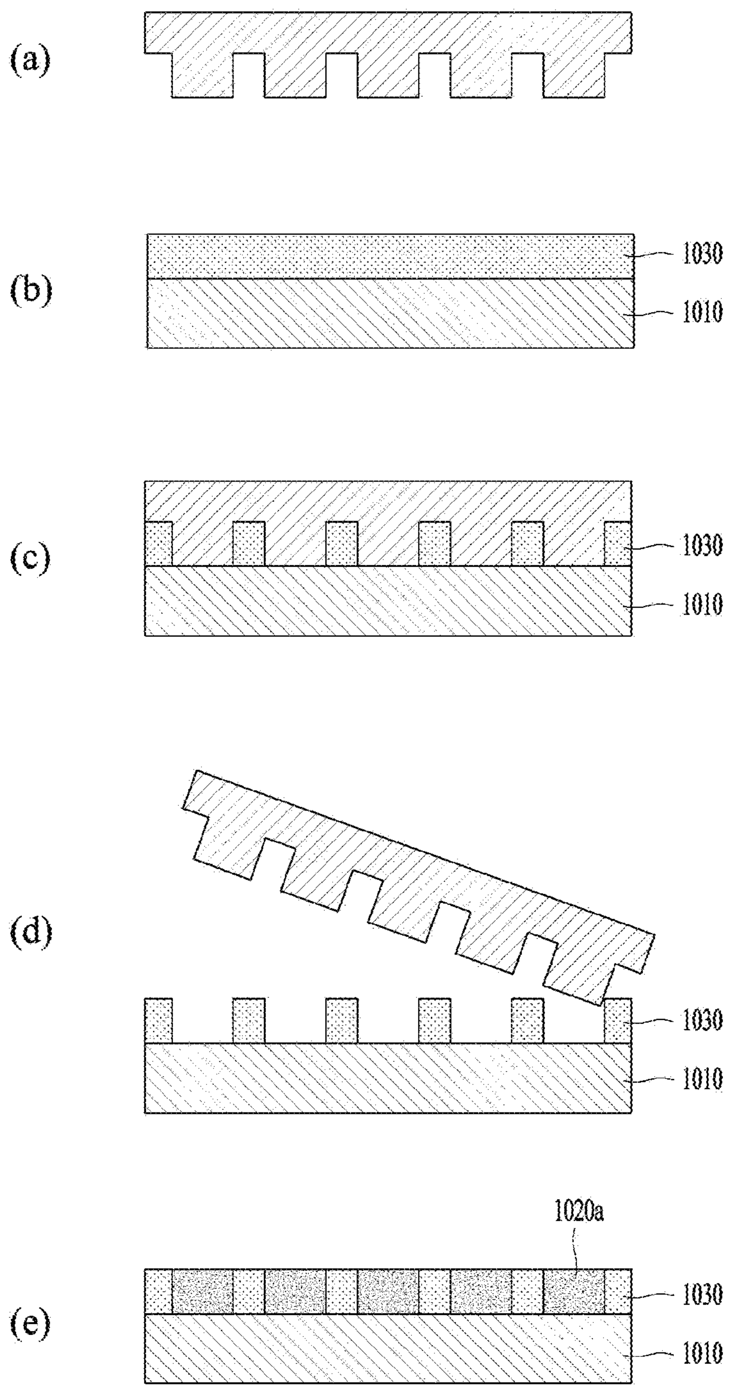
FIG. 1 is a view illustrating a method of forming a metal mesh pattern in the form of a transparent electrode according to an embodiment.

Description will now be given in detail according to one or more embodiments disclosed herein, with reference to the accompanying drawings. For the sake of brief description with reference to the drawings, the same or equivalent components may be provided with the same or similar reference numbers, and description thereof will not be repeated. In general, a suffix such as “module” and “unit” may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being “connected with” another element, the element can be connected with the another element or intervening elements may also be present. In contrast, when an element is referred to as being “directly connected with” another element, there are no intervening elements present.

A singular representation may include a plural representation unless it represents a definitely different meaning from the context.

Terms such as “include” or “has” are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, robots, and the like.

Hereinafter, a transparent antenna module and a method for manufacturing the same according to the present disclosure will be described in detail. The transparent antenna module according to the present disclosure may be implemented on a display of the aforementioned electronic device. Meanwhile, FIG. 1 is a view illustrating a method of forming a metal mesh pattern in the form of a transparent electrode according to an embodiment. Referring to FIG. 1, (a) an imprint mold may be prepared. (b) A dielectric structure 1030 in the form of UV resin may be disposed on a dielectric substrate 1010, which is a transparent substrate. (c) The imprint mold may be coupled to the dielectric structure 1030 in the form of UV resin, disposed on the dielectric substrate 1010, such that the dielectric structure 1030 is stamped.

(d) The dielectric structure 1030 in the form of UV resin may be formed in the stamped shape by removing the imprint mold. Accordingly, the dielectric structures may be formed to be spaced a gap region (gap area) having a predetermined gap (distance) apart from each other in at least one axial direction. (e) A conductive layer 1020*a* of a metal mesh pattern may be formed in the gap region with the predetermined gap between the adjacent dielectric structures. A transparent antenna module may be implemented by the metal mesh pattern.

In this regard, recent trends in products such as mobile phones, TVs, automobiles, and the like demand products that satisfy both premium performance and creative design. Using electrodes used in electronic components as transparent conductive electrodes has the advantage of providing a high degree of freedom in product design. The purpose of forming metal electrodes in a mesh or grid shape is to form a plurality of electrodes or electrode patterns of various shapes on the same plane on a substrate. In particular, the present disclosure is directed to forming a transparent conductive pattern that is invisible to user's eyes by finely narrowing a line width of the electrode pattern to reduce visibility.

Meanwhile, the substrate used herein may be a highly transparent substrate with high visible light transmittance. In this regard, since the fundamental purpose of electrodes is to transmit electrical signals without loss, it is very important to form electrodes with high electrical conductivity or low resistance. The resistance of an electrode is determined by the shape of an electrode pattern or an electrode material to be used, and may be designed in various ways depending on how to use a component for which the electrode is used. For example, transparent electrodes for touch screen sensors used in displays of smartphones or tablets may be used as long as sheet resistance is 80~100Ω/□. On the other hand, for laptops or medium-sized TVs, it is necessary to form electrodes with sheet resistance of about 10 to 50Ω.

Meanwhile, in order to use a conductor as a radiator for an antenna, a sheet resistance characteristic of 2Ω or less is required, which is much smaller than a sheet resistance value of an electrode for a touch sensor. This is because an antenna with minimum resistance must be implemented to reduce loss of wireless signals. In particular, when attempting to design and manufacture a transparent antenna by forming an antenna radiator in the form of a metal mesh, it is necessary to achieve desired surface resistance value and transparency by considering resistivity of an electrode material to be used, a line width of a mesh pattern, a thickness of a mesh pattern, a spacing between patterns, etc. Additionally, techniques such as photolithography & etching, sputtering, self-additive process (SAP), imprinting, and the like may be applied to a process of producing a metal mesh pattern.

An appropriate manufacturing method may be selected by considering process capability, process cost, and mass productivity of each manufacturing method. Semiconductor processes such as photolithography & etching may achieve fine line widths, but costs may increase. Sputtering has a long process time and is also expensive. SAP is difficult to implement fine patterns, which may increase visibility when producing the patterns.

On the other hand, the imprinting process is a relatively simple, low-cost process that can produce fine patterns and even secure mass production, but it is difficult to reduce a sheet resistance value, which is the most important performance of an electrode, below a certain level. This is because a metal material used to form a fine conductive pattern by the imprinting process is in the form of metal ink or metal paste, which is a compound of metal and organic materials. This results from that organic substances having a high resistance value compared to high conductivity of a metal are contained. It is impossible to completely remove an organic component of the ink or paste even if the organic component is volatilized through heat treatment during the process. Therefore, the organic substances may act as impurities even when an extremely small amount remains, thereby causing an effect of increasing resistance.

In addition, since a metal component sintered from a metal-organic compound is crystallized in the form of particles or rods, if the connection (contact) between metal particles is uncertain, it also causes an increase in resistance.

In this regard, referring to FIG. 1, a method for manufacturing a metal mesh by an imprinting process may include a) producing a mold with a desired pattern formed, b) forming UV-curable resin on a substrate, and then c) stamping the mold onto the resin. The method may further include d) curing the resin by irradiating ultraviolet rays after removing the mold. The method may further include e) printing a metal ink or metal paste onto the patterned resin structure. Finally, organic substances are dried through heat treatment and the metal is sintered. The metal mesh produced by this imprinting method has high resistance for the same reason as described above, and in order to lower the resistance, a line width or thickness of the metal mesh must be increased. However, since this lowers transmittance of a transparent electrode, the metal mesh pattern loses its function as a transparent electrode, and there is a limit to lowering the resistance by increasing the line width or thickness of the pattern.

In the present disclosure, to solve those disadvantages and fully use advantages in the imprinting process, an imprinting method and a metal mesh structure that lower a surface resistance value upon a metal mesh manufacturing process by the imprinting process is proposed. In this regard, FIG. 2 is a view illustrating a method of forming a metal mesh pattern in the form of a transparent electrode according to another embodiment.

Figure 2:
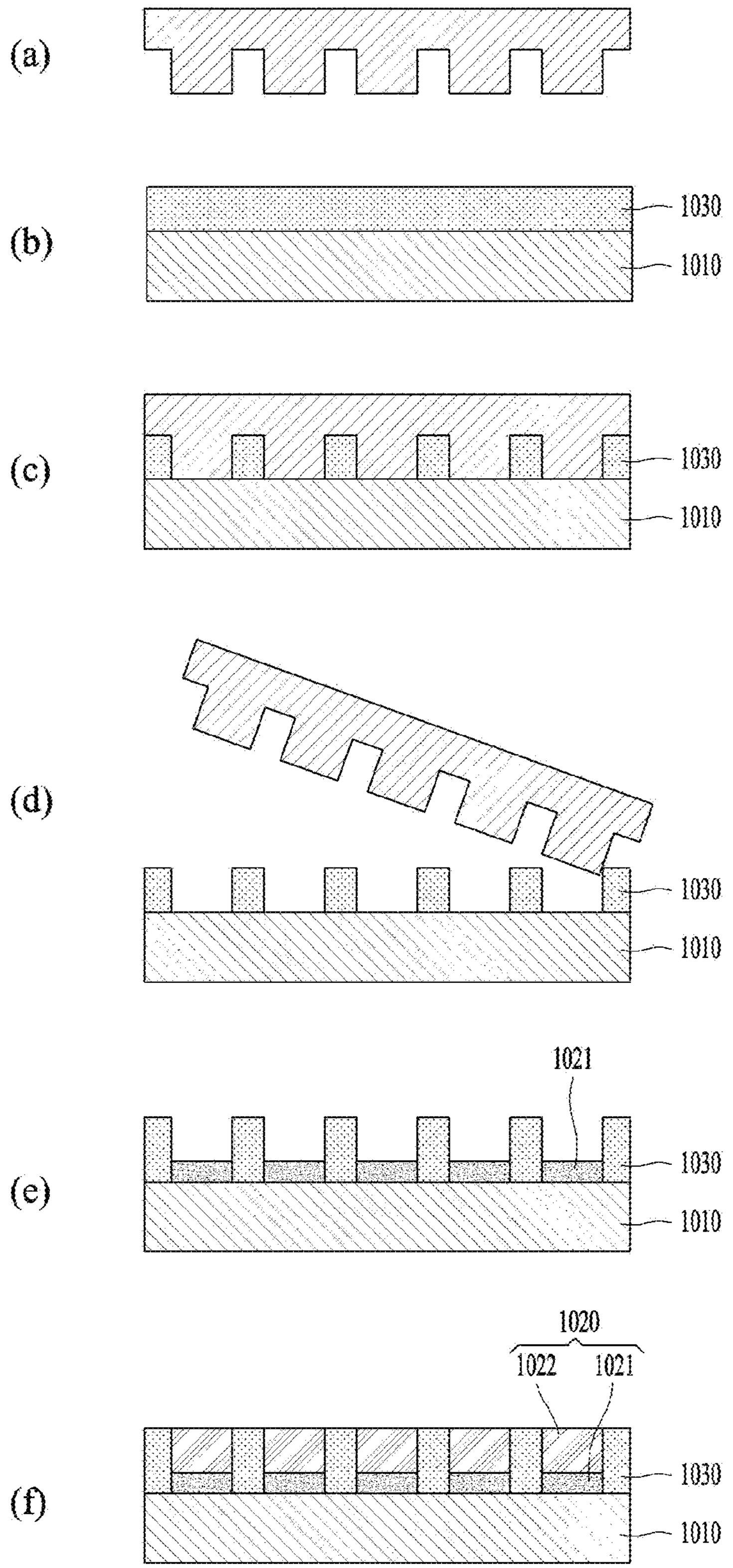
FIG. 2 is a view illustrating a method of forming a metal mesh pattern in the form of a transparent electrode according to another embodiment.

Referring to FIG. 2, a metal mesh manufacturing method by an imprinting process may include a) producing a mold with a desired pattern formed thereon, b) forming a dielectric structure 1030 in the form of UV-curable resin on a dielectric substrate 1010, and then c) stamping the mold onto the dielectric structure 1030. d) Additionally, curing may be performed by irradiating ultraviolet rays after removing the mold.

Meanwhile, e) when printing metal ink or paste, it is printed by a partial thickness of the dielectric structure 1030 in the form of UV resin, not by the entire thickness of the dielectric structure 1030. Accordingly, the dielectric structures each having a first conductive layer 1021, which is printed with a metal mesh pattern by a partial thickness, serve as seed layers for electroless plating during plating. f) A second conductive layer 1022 is formed by plating a metal on the printed metal particles by the thickness of the dielectric structure. The metal formed through plating has a layer structure, other than the form of particle or rod, compared to the metal formed of ink or paste. Accordingly, the metal plating layer may have an excellent electrical contact and may be used as a main connection path for transmission of electrical signals. Additionally, a resistance value may be adjusted by adjusting a thickness of the metal plating layer, and the thickness of the printed metal layer used as a seed layer may also be reduced. Accordingly, a multi-layered conductive layer 1020 that the second conductive layer 1022 is formed on top of the first conductive layer 1021 may be disposed in a gap region (or gap area) of the dielectric structure 1030.

Figure 3A:
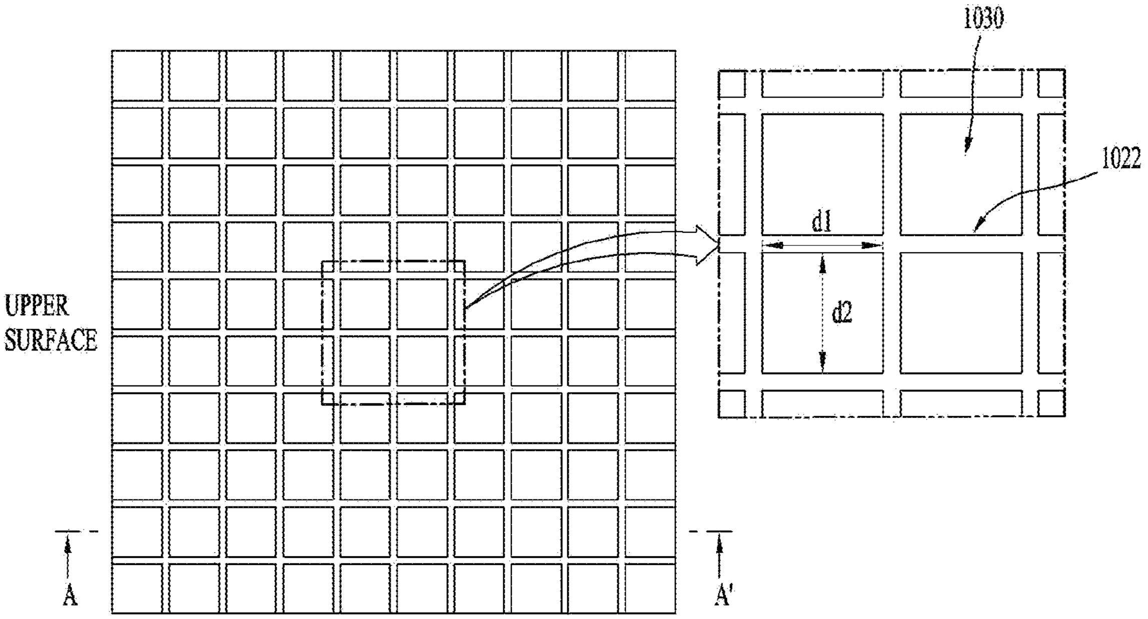
FIGS. 3A and 3B are views illustrating a structure of a high-conductive metal mesh pattern according to an embodiment.
Figure 3B:
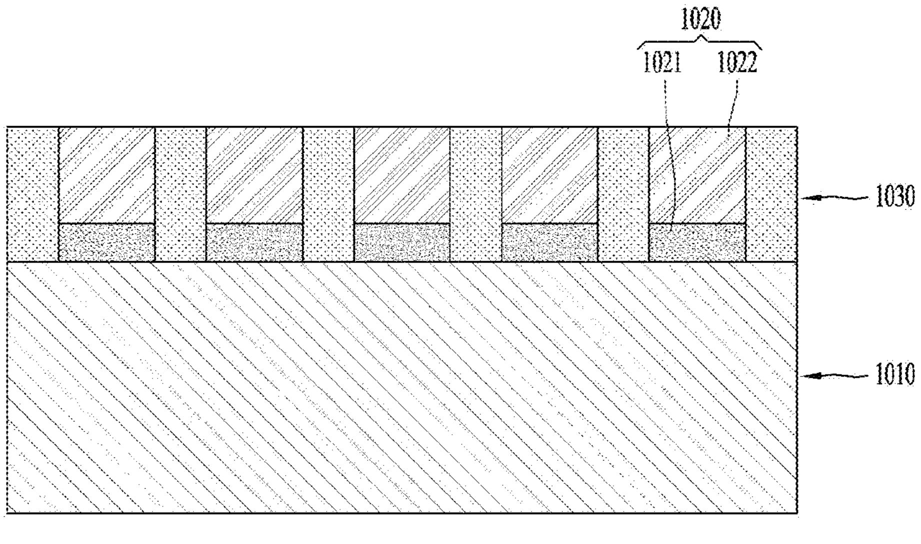

Meanwhile, FIGS. 3A and 3B are views illustrating a structure of a high-conductive metal mesh pattern according to an embodiment. FIG. 3A illustrates a front view of a highly conductive metal mesh grid structure and an enlarged view of the grid structure. Also, FIG. 3B illustrates a side view of the highly conductive metal mesh grid structure of FIG. 3A. In this regard, FIG. 3A illustrates the metal mesh grid structure manufactured by the manufacturing process of FIG. 2.

Referring to FIG. 3A, the second conductive layer 1022 may be formed in a gap region, which is an empty space between the dielectric structures 1030. Referring to FIG. 3B, the first conductive layer 1021 may be formed below the second conductive layer 1022. The first conductive layer 1021 may also be formed in the gap region, which is the empty space between the dielectric structures 1030.

Referring to FIGS. 2 to 3B, the dielectric substrate 1010 that is capable of supporting the metal mesh pattern is disposed, and the dielectric structure 1030 made of UV-curable resin is disposed on an upper surface of the dielectric substrate 1010. Meanwhile, the first and second conductive layers 1021 and 1022 which are made of a metal material are filled in the space between the dielectric structures 1030 to form a conductive electrode mesh.

At this time, the metal material is formed to have a thickness lower than a thickness of the resin structure. Then, a metal layer is formed on the filled metal material through a plating process. The thickness of the metal plating layer does not exceed the remaining thickness of the resin structure after the metal material is filled.

A material used as a substrate may be glass, silicon wafer, etc., and an organic substrate material, such as polyimide, may be used to produce a flexible conductive electrode mesh. In particular, a transparent flexible material, such as PET, COP, CPI, or the like, may be used to produce a transparent conductive mesh pattern. At this time, light transmittance of a transparent material to be used is preferably 85% or more.

In addition, in order to use a conductive metal mesh pattern as an antenna radiator for high-frequency communication, a substrate with low dielectric constant and low dielectric loss must be used to minimize the loss of wireless signals, and a material with a dielectric constant of 3.0 or less and a dielectric loss of 0.007 or less is preferably used. UV resin used as a structure of a metal mesh pattern may be thermosetting resin or photocurable resin. Preferably, photocurable resin is used to suppress damage to a material due to a heat treatment process. The metal material that is filled between structures may be aluminum, copper, silver, gold, etc. to be used as a conductor. However, different types of metals may be used depending on the use and purpose and are not limited to the above-mentioned types of metals.

Additionally, in addition to single metals, conductive oxides, conductive carbon composite materials, etc. may be used. A process of forming a conductor to be used may be a printing process, a deposition process, or a transfer process, and a printing process is effective as a process of filling a metal material in a space between structures formed on a substrate. Additionally, in order to be filled between the structures through the printing process, a metal is in the form of ink or paste in which metal and organic substances are mixed. The metal ink or paste that is filled in the space between the structures serves as a seed layer for plating, so the metal content only needs to be 5% or more. Additionally, the shape of a metal mesh pattern is shown as a pattern in a linear form in which mesh lines are vertically orthogonal to each other, but is not limited thereto. As another example, each mesh line may be changed to mesh patterns of various shapes such as rectangle diamond, triangle, hexagon, etc.

Hereinafter, a conductive layer structure with a double-layer structure according to the present disclosure will be described. In this regard, FIGS. 4A and 4B are views illustrating a conductive layer that is applied as a single-layer structure and a double-layer structure onto a dielectric substrate.

Figure 4A:
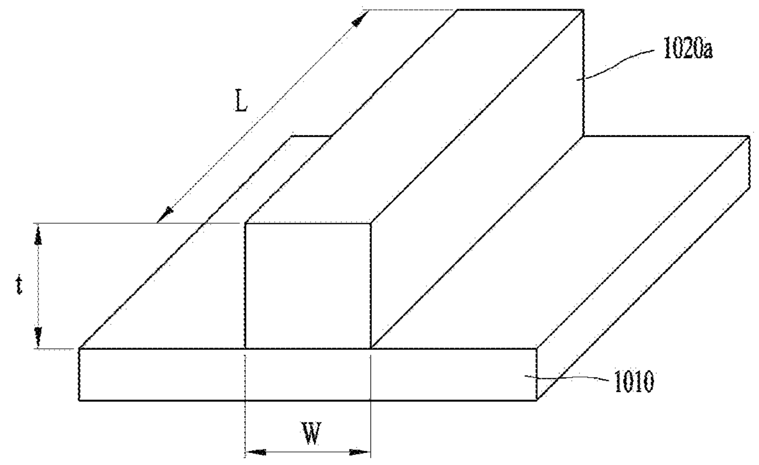
FIGS. 4A and 4B are views illustrating a conductive layer structure that is applied as a single-layer structure and a double-layer structure onto a dielectric substrate.

Referring to FIG. 4A, a conductive layer 1020*a* may be formed in a single-layer structure on the dielectric substrate 1010. The conductive layer 1020*a* may have a rectangular parallelepiped shape with predetermined width W, length L, and thickness t.

Figure 4B:
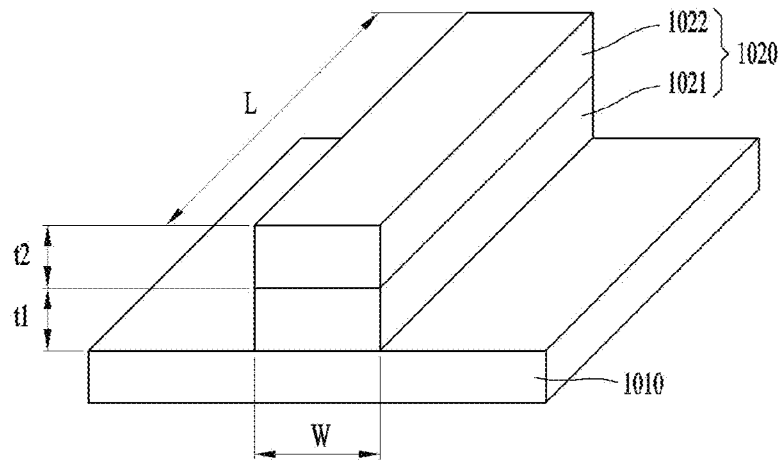

Referring to FIG. 4B, a conductive layer 1020 may be formed in a double-layer structure on the dielectric substrate 1010. The conductive layer 1020 may be configured to include a first conductive layer 1021 and a second conductive layer 1022 disposed above the first conductive layer 1021. The first conductive layer 1021 may be formed to be in contact with the dielectric substrate 1010 and have a first thickness t1. The first conductive layer 1021 may have a rectangular parallelepiped shape with predetermined width W, length L, and first thickness t1. The second conductive layer 1022 may be formed to be in contact with the first conductive layer 1021 and have a second thickness t2. The second conductive layer 1022 may have a rectangular parallelepiped shape with predetermined width W, length L, and second thickness t2.

Referring to FIGS. 1 to 3B, the dielectric structures 1030 in the form of UV resin may be disposed on both sides of the conductive layer 1020*a*, 1020 illustrated in FIGS. 4A and 4B. When a signal is transmitted in a length (L) direction of the conductive layer 1020*a*, 1020, resistance R of the conductive layer 1020*a*, 1020 is proportional to resistivity r and length L of a metal and inversely proportional to a cross-sectional area (S=W*t) of the metal, as expressed in Equation 1 below.

$$R = \frac{\rho \cdot L}{W \cdot t} \quad \text{[Equation 1]}$$

As illustrated in FIGS. 2 to 4B, when the conductive layer 1020 is formed by stacking two or more layers of different materials, it is the same as the case where conductors are connected in parallel. Therefore, it is desirable that a layer having low resistance has a greater thickness to achieve a low overall resistance value or high conductivity.

Since the first conductive layer 1021 of the conductive layer 1020 proposed herein is formed of metal ink or paste, it achieves a high resistance value due to the influence of organic substances. On the other hand, since the second conductive layer 1022 of the conductive layer 1020 is formed by plating, the inherent conductivity of the metal may be fully utilized.

In order to reduce the resistance of the metal conductor mesh pattern according to the present disclosure to be lower than a resistance value of a mesh pattern formed by a printing process, the first thickness t1 of the first conductive layer 1021 and the second thickness t2 of the second conductive layer 1022 may be determined. For example, a thickness ratio between the first thickness t1 of the first conductive layer 1021 and the second thickness t2 of the second conductive layer 1022 may be in the range of 1:9 to 9:1, but is not limited to this.

In this regard, the first thickness t1 of the first conductive layer 1021 having low resistance may be thicker than the second thickness t2 of the second conductive layer 1022. Accordingly, a thickness ratio between the first thickness t1 of the first conductive layer 1021 and the second thickness t2 of the second conductive layer 1022 may be in the range of 1:1 to 9:1, but is not limited to this. Thus, since a material with low resistivity and high conductivity is stacked on the second conductive layer 1022, total sheet resistance of the conductive layer is lowered as expressed in Equation 1.

Figure 5:
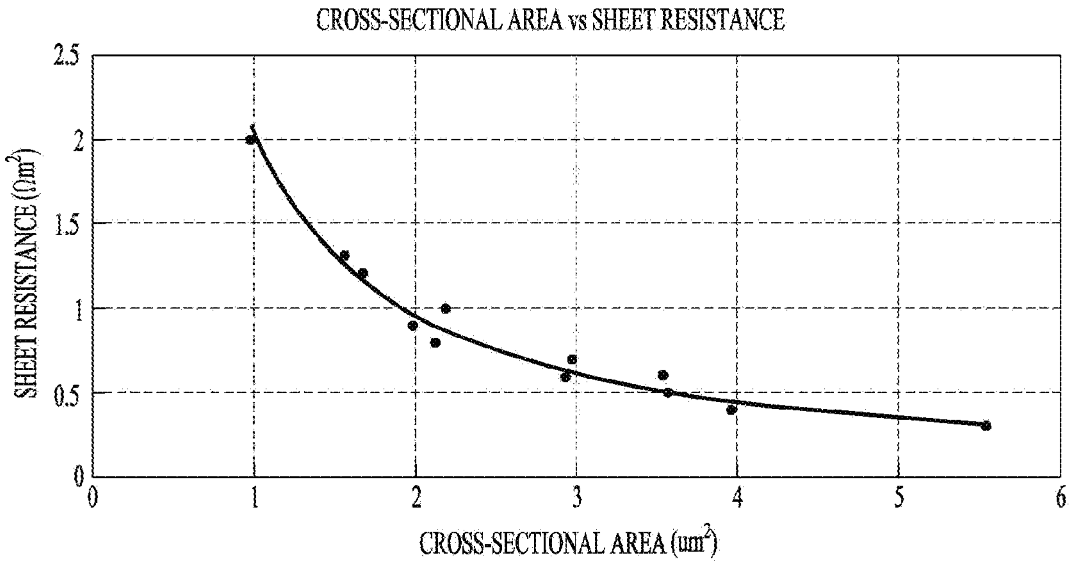
FIG. 5 is a graph showing a sheet resistance value with respect to a cross-sectional area of a mesh pattern in a conductive electrode according to a conductive layer structure in the present disclosure.

Meanwhile, FIG. 5 is a graph showing a sheet resistance value with respect to a cross-sectional area of a mesh pattern in a conductive electrode according to a conductive layer structure in the present disclosure. Referring to Equation 1 and FIG. 5, since the total conductor resistance or sheet resistance is inversely proportional to the cross-sectional area, as illustrated in FIG. 5, the sheet resistance value decreases as the cross-sectional area increases. Accordingly, when the conductive layer has a constant width, the sheet resistance value is inversely proportional to the thickness of the conductive layer. To this end, as described above, the first thickness t1 of the first conductive layer 1021 having low resistance may be thicker than the second thickness t2 of the second conductive layer 1022.

Figure 6:
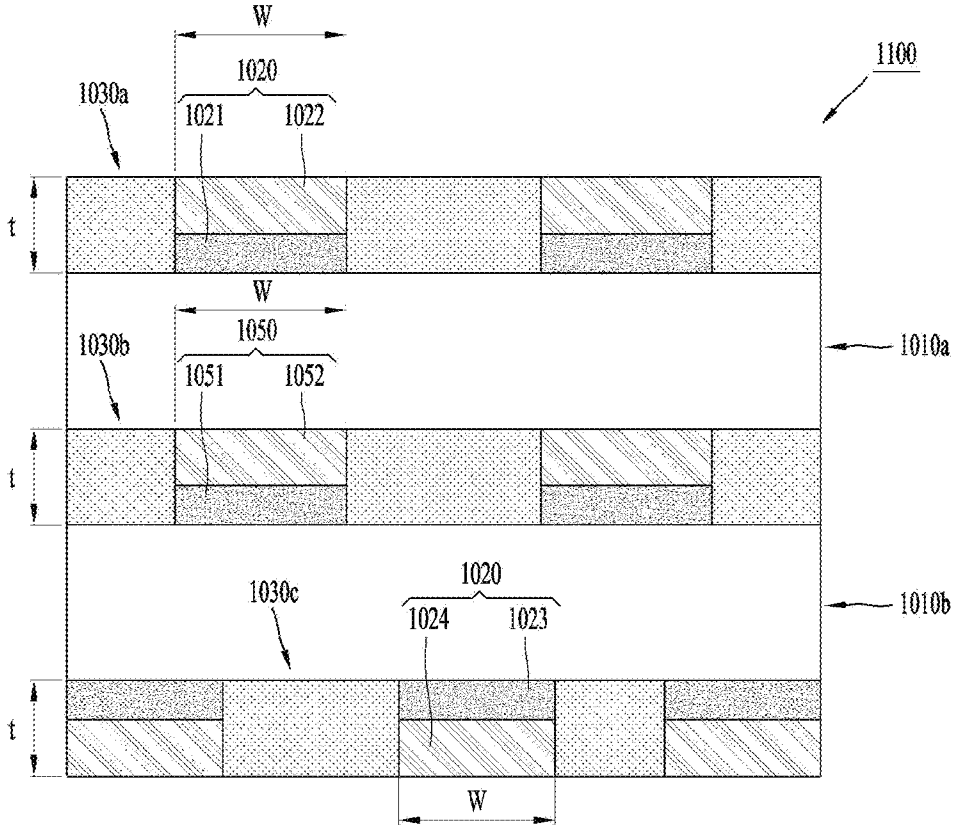
FIGS. 6 and 7 are views illustrating cross-sectional shapes of dielectric structures and corresponding conductive layer structures according to different embodiments of the present disclosure.
Figure 7:
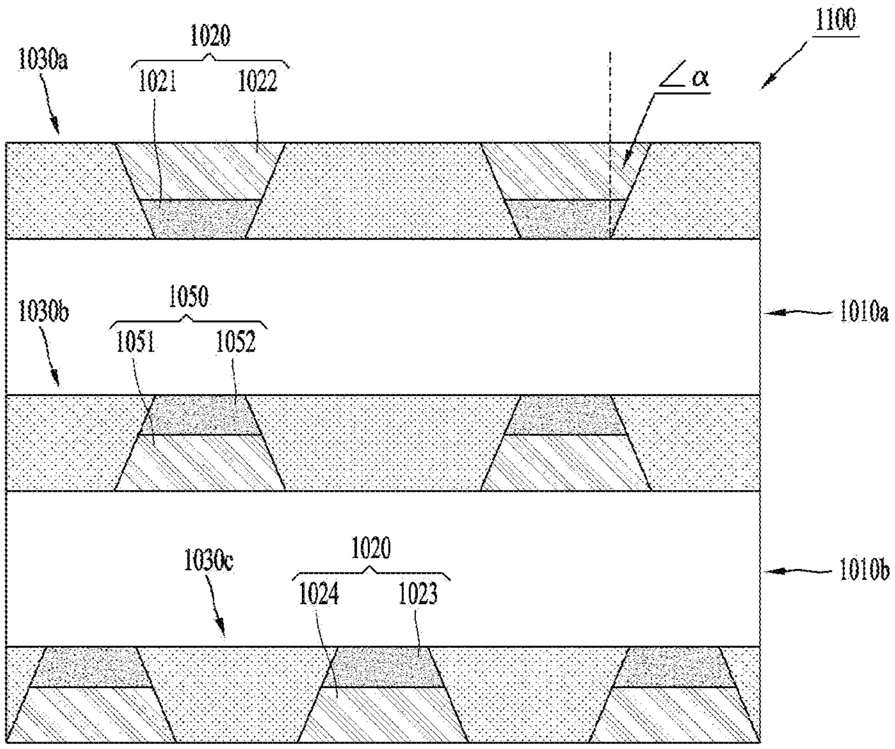

Meanwhile, FIGS. 6 and 7 are views illustrating cross-sectional shapes of dielectric structures and corresponding conductive layer structures according to different embodiments of the present disclosure. Specifically, FIG. 6 illustrates a dielectric structure 1030 having a rectangular cross-sectional shape and a structure in which first and second conductive layers 1021 and 1022 are disposed between the dielectric structures 1030. On the other hand, FIG. 7 illustrates a dielectric structure 1030*b* having a trapezoidal cross-sectional shape and a structure in which first and second conductive layers 1021 and 1022 are disposed between the dielectric structures 1030*b*. Referring to FIGS. 6 and 7, the first conductive layer 1021 and the second conductive layer 1022 disposed above the first conductive layer 1021 may be referred to as a conductive layer 1020.

Referring to FIGS. 6 and 7, since the conductive layer 1020 is formed between the dielectric structures 1030, the shape of the dielectric structure 1030 plays a role of determining the cross-sectional shape and cross-sectional area of the conductive layer 1020. A ratio t/W of thickness to width in a rectangular cross-sectional shape is called an aspect ratio. The dielectric structure 1030 is manufactured by determining the aspect ratio when designing a pattern according to how to use a conductive mesh pattern. That is, in order to manufacture a transparent conductive electrode by forming a conductive metal mesh pattern, a cross-sectional shape having a high aspect ratio with great thickness and narrow width may increase transmittance and reduce sheet resistance. As an example, the conductive layer 1020 may be configured in a square cross-sectional shape with an aspect ratio of $t/W \leq 3$.

In this regard, the conductive layer 1020 may be configured as a single conductive layer 1020*a* as illustrated in FIG. 4A or a double conductive layer 1020 as illustrated in FIG. 4B. When configured as the double conductive layer 1020, the double conductive layer 1020 may include the first conductive layer 1021 on a lower region and the second conductive layer 1022 on an upper region.

Referring to FIG. 7, since the plating process is performed using the first conductive layer 1021 as a seed layer, the conductive layer 1020 may be configured to have a cross-section in an inverted trapezoidal shape with a wide entrance and a narrow inside to easily form a plating layer in spite of a fine line width. When a ratio of entrance to base plane of the inverted trapezoid is expressed by an angle $\alpha$ between a surface perpendicular to a substrate and an inclined surface of the trapezoid, the cross-sectional shape of the inverted trapezoid preferably satisfies a radio of $0 \leq \alpha \leq 45°$.

Meanwhile, referring to FIGS. 6 and 7, the first conductive layer 1021 and the second conductive layer 1022 may be formed on a front surface of the dielectric substrate, and a first ground layer 1051 and a second ground layer 1052 may be formed on a rear surface of the dielectric substrate. To this end, an imprinting process may be performed to form a first gap region and a second gap region on the front and rear surfaces of the dielectric substrate 1010.

The first ground layer 1051 may be formed to be in contact with the dielectric substrate in the gap region formed on the rear surface of the dielectric substrate 1010 and have a first thickness. The second ground layer 1052 may be formed to be in contact with the first ground layer 1051 in the gap region formed on the rear surface of the dielectric substrate 1010 and have a second thickness.

A ground layer 1050 having a metal mesh grid structure may be formed by the first ground layer 1051 and the second ground layer 1052. In this regard, a gap region in which the first and second ground layers 1051 and 1052 are to be disposed may be formed on the rear surface of the dielectric substrate by a second dielectric structure 1030*b*. A grid spacing and a grid intersection point of the first and second conductive layers 1021 and 1022 may be configured to be different from those of the first and second ground layers 1051 and 1052.

Meanwhile, a second dielectric substrate 1010*b* may be separately disposed below the ground layer 1050 of the mesh grid structure, and a third conductive layer 1023 and a fourth conductive layer 1024 may be disposed below the second dielectric substrate 1010*b*. A third dielectric structure 1030*c* may be disposed on a rear surface of the second dielectric substrate 1010*b* so that the third conductive layer 1023 and the fourth conductive layer 1024 are disposed in the gap region.

In a transparent antenna module with a multi-layered substrate structure, the third conductive layer 1023 and the fourth conductive layer 1024 may configure a separate feed line. A signal of a feed line may be transmitted to the first and second conductive layers 1021 and 1022 where the antenna element is disposed through a slot region (i.e., the second dielectric structure) where the ground layer 1050 is not disposed.

The foregoing description has been given of the metal mesh pattern formed of the conductive layer with the single layer or double layer structure according to the present disclosure. Hereinafter, a transparent antenna module having a metal mesh pattern formed of a conductive layer with a double layer structure will be described.

Figure 8:
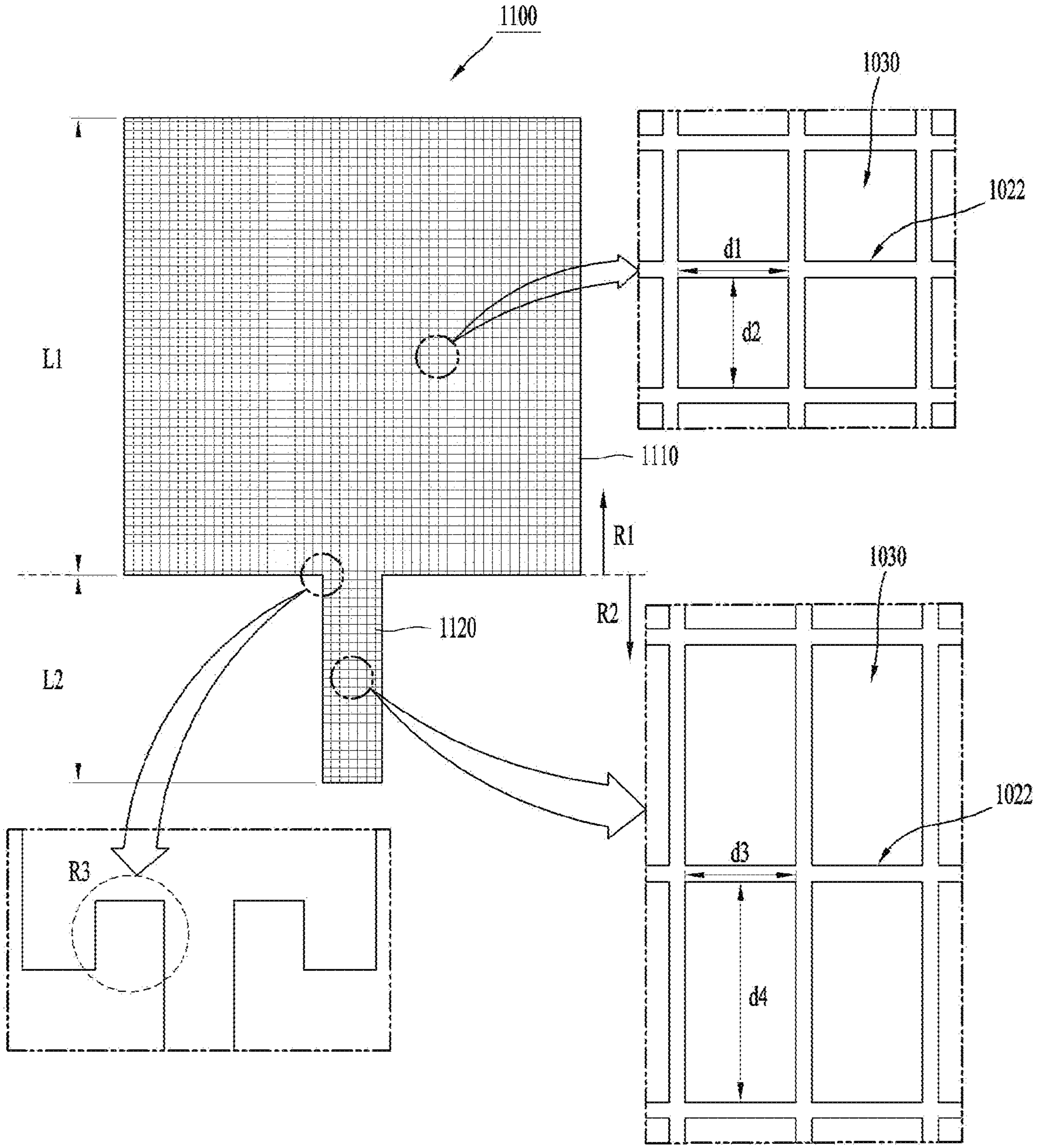
FIG. 8 is a view illustrating an antenna radiator (antenna element) and a feed pattern (feed line) of a transparent antenna module with a metal mesh pattern formed of a conductive layer of a double-layer structure according to the present disclosure.

In this regard, FIG. 8 is a view illustrating an antenna radiator (antenna element) and a feed pattern (feed line) of a transparent antenna module with a metal mesh pattern formed of a conductive layer with a double layer structure according to the present disclosure.

As illustrated in FIGS. 2 to 4B, an antenna element 1110 and a feed line 1120 of FIG. 8 may be formed on the dielectric substrate 1010 by the conductive layer 1020 with the predetermined width W and the predetermined length L.

Hereinafter, a transparent antenna module 1100 according to the present disclosure will be described with reference to FIGS. 2 to 8. The transparent antenna module 1100 may include a dielectric substrate 1010, a dielectric structure 1030, 1030*b*, and a conductive layer 1020*a*, 1020.

The dielectric structure 1030, 1030*b* may be formed in contact with an upper portion of the dielectric substrate 1010. The dielectric structures 1030, 1030*b* may be formed to be spaced a gap region of a predetermined gap apart from each other in at least one axial direction. The dielectric structure 1030, 1030*b* may be formed in one axial direction and in another axial direction substantially perpendicular to the one axial direction. Accordingly, the metal mesh grid structure formed by the conductive layer 1020*a*, 1020, as illustrated in FIGS. 3A and 8, may be formed as a square mesh grid structure, but is not limited thereto.

As described above, the conductive layer 1020 may be configured to include the first conductive layer 1021 and the second conductive layer 1022 disposed above the first conductive layer 1021. The first conductive layer 1021 may be formed to be in contact with the dielectric substrate 1010 and have a first thickness t1. The first conductive layer 1021 may have a rectangular parallelepiped shape with predetermined width W, length L, and first thickness t1. The second conductive layer 1022 may be formed to be in contact with an upper portion of the first conductive layer 1021 and have a second thickness t2. The second conductive layer 1022 may have a rectangular parallelepiped shape with predetermined width W, length L, and second thickness t2.

The transparent antenna module 1100 may be configured by the first conductive layer 1021 and the second conductive layer 1022, and a transparent metal mesh pattern formed in at least one axial direction may be configured to radiate a wireless signal.

The dielectric structure 1030, 1030*b* may be made of UV resin disposed in contact with the upper portion of the dielectric substrate 1010, but is not limited thereto. The dielectric structures 1030, 1030*b* may be formed by stamping UV resin using an imprint mold and spaced apart from each other by a gap region of a predetermined gap to form a dielectric grid structure. Accordingly, the conductive layers 1020*a*, 1020 may be disposed in empty spaces formed by the dielectric grids of the dielectric structures 1030, 1030*b* to form a metal grid structure. A transparent metal mesh pattern corresponding to the metal grid structure, in which the conductive layer 1020*a*, 1020 is disposed, may configure the antenna element 1110 and the feed line 1120 that radiate wireless signals.

The first conductive layer 1021 may be formed by printing metal ink or metal paste in the gap region by the first thickness t1 that is thinner than the thickness of the dielectric structure 1030, 1030*b*. The second conductive layer 1022 may be formed to have the second thickness t2 through a plating process on the printed metal ink or metal paste of the first conductive layer 1021. In this regard, the second conductive layer 1022 may operate as a main connection path for wireless signals. Since electromagnetic waves are mainly formed in a surface area of the conductive layer 1020*a*, 1020, the second conductive layer 1022 may operate as a main connection path of wireless signals. On the other hand, the first conductive layer 1021 mainly operates as a layer coupled with the dielectric structure 1030, 1030*b* and the second conductive layer 1022.

A difference between the total thickness of the conductive layer 1020 corresponding to the sum of the first thickness t1 of the first conductive layer 1021 and the second thickness t2 of the second conductive layer 1022 and the thickness of the dielectric structure 1030, 1030*b* may be within a predetermined range.

In this regard, the second thickness t2 of the second conductive layer 1022, which has a low resistance value, that is, high conductivity, may be thinner than the first thickness t1 of the first conductive layer 1021. Accordingly, sheet resistance due to the transmission of wireless signals can decrease, thereby reducing the loss of the transparent metal mesh pattern.

Referring to FIG. 7, the dielectric structure 1030*b* may be inclined at an angle of 45 degrees or less with respect to a vertical axis. In this regard, the width of the gap region of the dielectric structure 1030*b* may decrease as the gap region is getting adjacent to the dielectric substrate 1010. In other words, the width of the gap region in the lower region of the dielectric structure 1030*b* may be narrower than the width of the gap region in the upper region. Accordingly, the first conductive layer 1021 may be formed in a hexahedral shape with an inverted trapezoidal cross-sectional area such that the area of the upper region is larger than the area of the lower region. Furthermore, the second conductive layer 1022 may also be formed in a hexahedral shape with an inverted trapezoidal cross-sectional area such that the area of the upper region is larger than the area of the lower region.

The width and thickness of the dielectric structure and the conductive layer structure constituting the transparent antenna module disclosed herein may be adjusted depending on an application. In this regard, the thickness of the dielectric structure 1030, 1030*b* may be greater than the width of the gap region of the dielectric structure 1030 and 1030*b*. In the dielectric structure 1030*b* with the inverted trapezoidal structure, the total thickness t may be greater than the average width W of the gap region. As another example, in the inverted trapezoidal dielectric structure 1030*b*, the total thickness t may be greater than the maximum width W2 of the gap region. Depending on an application, in the inverted trapezoidal dielectric structure 1030*b*, the second thickness t2 of the second conductive layer 1022 through which electromagnetic waves pass may be formed to be greater than the average width W of the gap region. As another example, in the inverted trapezoidal dielectric structure 1030*b*, the second thickness t2 of the second conductive layer 1022 through which electromagnetic waves pass may be formed to be greater than the maximum width W2 of the gap region.

In this regard, the thickness t of the conductive layer 1020 may be formed to be greater than the width of the conductive layer 1020. For example, the second thickness t2 of the second conductive layer 1022 may be formed to be greater than the width of the second conductive layer 1022 through which electromagnetic waves mainly pass. Accordingly, the sheet resistance can decrease while increasing the transmittance of the antenna element formed with the transparent metal mesh pattern.

Meanwhile, the first conductive layer 1021 may be formed by volatilizing organic components of a metal ink or metal paste through a heat treatment process. The dielectric structure 1030, 1030*b* may be formed of photocurable resin to suppress damage due to the heat treatment process. The second conductive layer 1022 may be formed on the first conductive layer 1021 through a plating process. The metal content of the second conductive layer 1022 may be set to be higher than the metal content of the first conductive layer 1021. Accordingly, the conductivity of the second conductive layer 1022 may be higher than that of the first conductive layer 1021.

As described above, the transparent antenna module 1100 may include an antenna element 1110 and a feed line 1120. The antenna element 1110 may have transparent metal mesh patterns disposed at first and second spacings in the first and second axial directions, to radiate wireless signals. The length L1 of the antenna element 1110 may be equal to an operating wavelength corresponding to an operating frequency or may be set to ½ to ¼ of the operating wavelength, but is not limited thereto.

The feed line 1120 may be configured to be connected to the antenna element 1110 to apply a wireless signal to the antenna element 1110. The length L2 of the feed line 1120 may be designed to be shorter than the length L1 of the antenna element 1110, thereby minimizing an overall antenna length.

An inset region R3 may be formed in an area where the antenna element 1110 and the feed line 1120 are connected, without a separate matching part, for example, an impedance conversion part, for impedance matching between the antenna element 1110 and the feed line 1120. A mesh grid, such as a mesh pattern, may be removed from an inner region of the antenna element 1110 within the inset region. Alternatively, the mesh grid in the inset region may be disconnected so as not to be connected to the mesh grid of the antenna element 1100. Meanwhile, even in the dielectric region, a mesh grid may also be disposed to maintain visibility with the mesh grids of the antenna element 1110 and the feed line 1120. The mesh grid disposed in the dielectric region may be configured to be disconnected from the mesh grids of the antenna element 1110 and the feed line 1120.

The feed line 1120 and the antenna element 1110 may be configured as metal mesh lines including the first conductive layer 1021 and the second conductive layer 1022. For example, the first and second spacings of the metal mesh lines configuring the feed line 1120 and the antenna element 1110 in the first axial direction and the second axial direction may be set to be the same. Accordingly, the antenna elements of the transparent antenna module can be freely disposed in at least one of the first axial direction and the second axial direction within the display region having the same metal mesh spacing, thereby increasing the freedom of disposition.

Meanwhile, in a first region R1 where the antenna element 1110 is disposed, a first spacing d1 and a second spacing d2 in the first axial direction and the second axial direction may be set to be the same. On the other hand, in a second region R2 where the feed line 1120 is disposed, third and fourth spacings in the first axial direction and the second axial direction may be set differently. In this regard, the third spacing in the first axial direction, which is the direction that current flows, may be set to be narrower than the fourth spacing in the second axial direction. Meanwhile, in order to reduce loss on the feed line 1120, the third spacing in the first axial direction may be set to be narrower than the first spacing in the first axial direction of the antenna element 1110.

Figure 9:
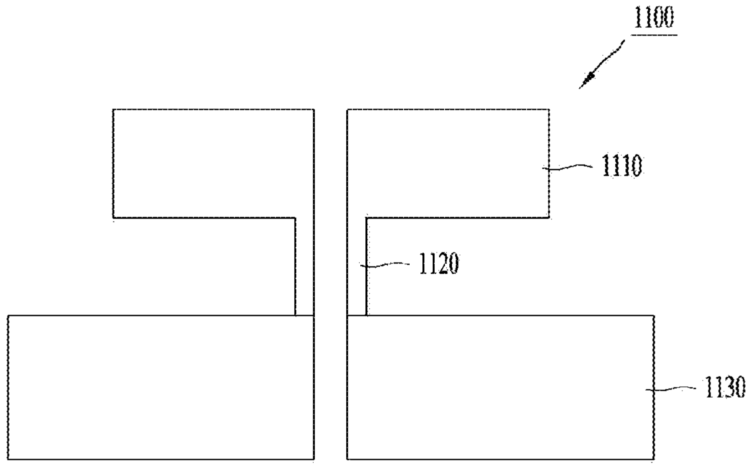
FIG. 9 is a view illustrating a configuration in which an antenna element having a metal mesh grid structure according to the present disclosure is connected to a terminal part through a feed line.

Meanwhile, the transparent antenna module according to the present disclosure may include an antenna element and a feed line having the metal mesh grid structure, as illustrated in FIG. 8, and the feed line may be connected to a terminal part in the form of a metal pattern. In this regard, FIG. 9 is a view illustrating a configuration in which an antenna element having a metal mesh grid structure according to the present disclosure is connected to a terminal part through a feed line. On the other hand, FIG. 10 is a view illustrating metal mesh grid structures of the antenna element and feed line of FIGS. 8 and 9.

The antenna element having the metal mesh grid structure disclosed herein may be configured as a patch antenna element as illustrated in FIG. 8 or a dipole antenna element as illustrated in FIG. 9. Meanwhile, the antenna element with the metal mesh grid structure is not limited to the patch antenna element or dipole antenna element, but may change into various forms such as a monopole antenna, a loop antenna, etc.

Referring to FIG. 8, unlike an electrode part that implements a mesh pattern with a fine line width to increase transmittance, the terminal part 1130 for signal transmission and signal connection with other components may be made of a metal filled in an entire area. This is to form a terminal part with as large area as possible to suppress signal loss due to a contact in the terminal part 1130 to which the signal is connected. Meanwhile, since a printing process requires a structure to fill and support metal ink or paste, it may not be easy to form the entire area of the terminal part 1130 with a metal.

Figure 10:
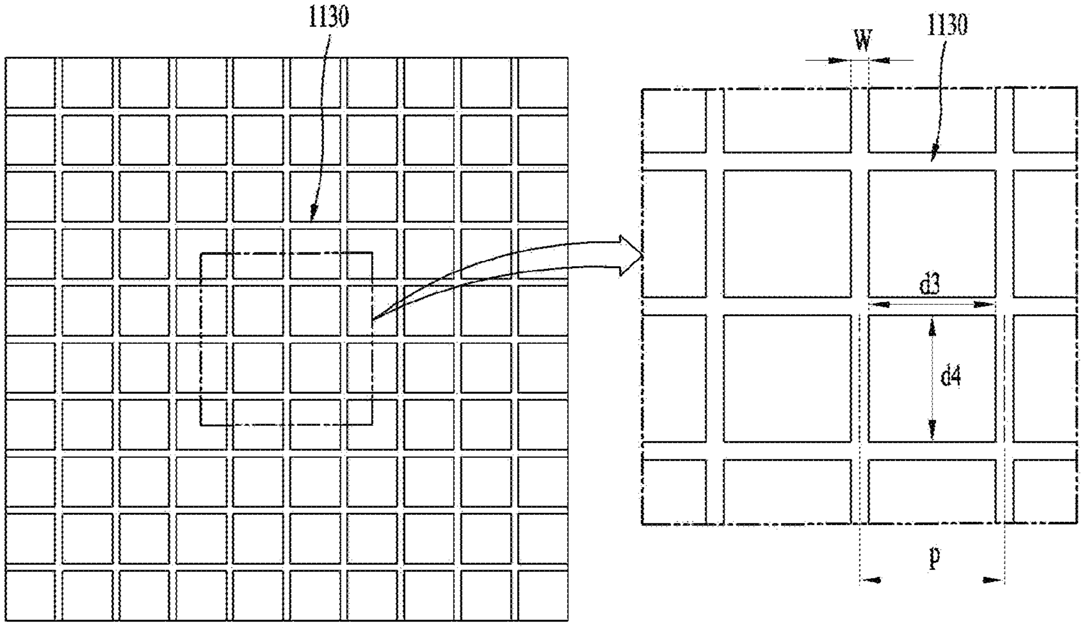
FIG. 10 is a view illustrating metal mesh grid structures of the antenna element and the feed line of FIGS. 8 and 9.

To solve this problem, in the present disclosure, a ratio of a line width of a mesh pattern and a spacing between patterns may be adjusted, as illustrated in FIG. 10, to secure the terminal part with the area as large as possible while using the printing process and maintaining the shape of the mesh pattern. The ratio of the line width of the mesh pattern and the spacing between the patterns may be a ratio of a pitch p, namely, a distance from a center of a line width of one mesh pattern to a center of a line width of an adjacent mesh pattern, with respect to the line width W of the mesh pattern, but is not limited to this. Referring to FIGS. 9 and 10, the terminal part 1130 may be formed in the range of $1<p/W\leq 10$.

In this regard, referring to FIGS. 2 to 10, the transparent antenna module disclosed herein may further include a terminal part 1130 in addition to the antenna element 1110 and the feed line 1120. The line width W of the metal mesh pattern of the terminal part 1130 may be set to be wider than the line width of the metal mesh pattern of the antenna element 1110. In addition, the third spacing d3 and the fourth spacing d4 in the first and second axial directions of the metal mesh pattern of the terminal part 1130 may be set to be narrower than the first spacing d1 and the second spacing d2 of the metal mesh pattern of the antenna element 1110 of FIG. 8.

Figure 11:
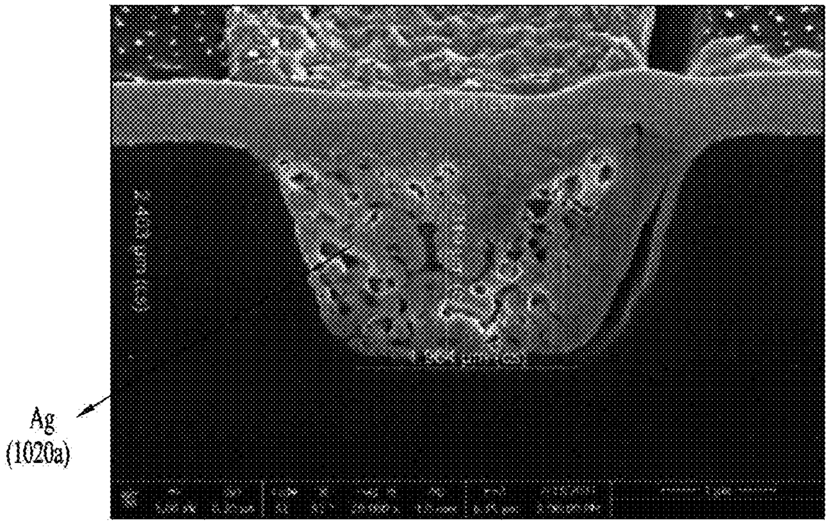
FIG. 11 is a view illustrating a cross-section of a conductive layer of a metal mesh pattern according to an embodiment.

FIG. 11 is a view illustrating a cross-section of a conductive layer of a metal mesh pattern according to an embodiment. Also, FIG. 12 is a view illustrating a cross-section of a first conductive layer of a metal mesh pattern and a second conductive layer corresponding to a plating layer according to an embodiment.

FIG. 11 illustrates an entire height of a structure formed through a printing process using Ag ink. As illustrated in FIG. 11, when a conductive layer is formed through a printing process using metal ink or paste, it is difficult to form a dense layer. This is because the organic substances are dried through heat treatment from ink or paste mixed with the organic substances, so a remaining metal particle layer contains pores. This additionally causes an increase in sheet resistance of the formed conductor layer. This is also similar to mesh patterns manufactured in the form of metal fibers using metal ink or paste.

Figure 12:
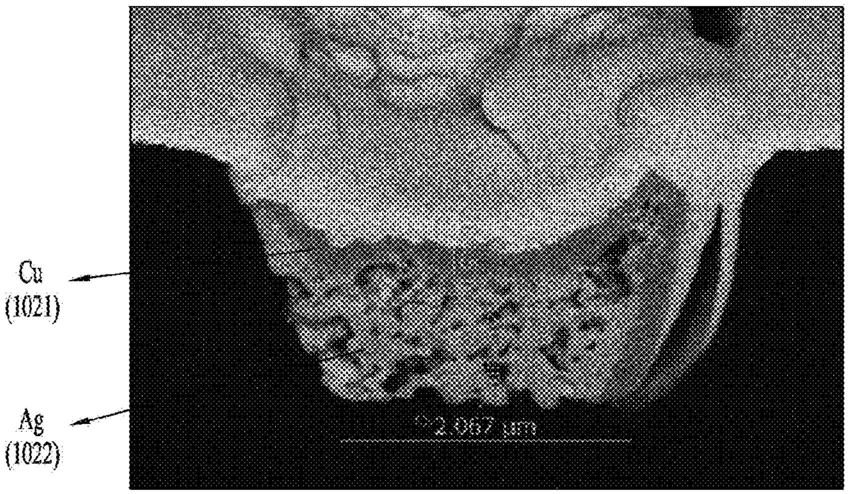
FIG. 12 is a view illustrating a cross-section of a first conductive layer of a metal mesh pattern and a second conductive layer corresponding to a plating layer according to an embodiment.

FIG. 12 illustrates that the first conductive layer 1021 is formed of Ag ink and the second conductive layer 1022 is formed through a plating process using the first conductive layer 1021 as a seed layer. Cu may be used as a plating material. For example, a thickness ratio between the first conductive layer 1021 and the second conductive layer 1022 may be about 4:1, but is not limited thereto. In this regard, the thickness ratio between the first conductive layer and the second conductive layer (plating layer) within the dielectric structure may be determined within the range of about 1:9 to about 9:1.

Meanwhile, Table 1 shows measured values of sheet resistance and transmittance of mesh patterns according to whether a plating process is performed or not.

On the other hand, FIG. 11B illustrates an embodiment in which the antenna 1100 operating in vertical/horizontal polarization disclosed herein is applied to a robot. Referring to FIGS. 1 to 13B, the antenna module 1100 may be disposed beneath a display 151*b* of a robot 1000*b*. The antenna module 1100 may be implemented as one of various combinations of a first antenna module 1100-1 and/or a second antenna module 1100-2 so as to operate as a multi-mode antenna. The first antenna module 1100-1 and the second antenna module 1100-2 may be implemented as different antenna elements disposed on different region of the display. As another example, the first antenna module 1100-1 and the second antenna module 1100-2 may be implemented as a single antenna element connected to first and second feeders in the form of vertical/horizontal polarization.

The transparent antenna module 1100 may operate in a 5G mmWave band. The antenna element of the transparent antenna module 1100 may be implemented as an array antenna to operate in the 5G mmWave band. Using the transparent antenna module 1100, the robot 1000*b* may perform transmission and reception of high-speed, high-capacity wireless data, for example, wireless AV data, with surrounding electronic devices.

The robot 1000*b* may interoperate with the server 300 through a communication network under the control of a controller such as a device engine. In this case, the communication network may be a 5G communication network.

TABLE 1

| Division | Reference | Line width (um) | Thickness (um) | Cross-sectional area (um2) | Sheet resistance (Ω/□) | Transmittance (%) |
|---|---|---|---|---|---|---|
| Before plating | FIG. 6 | 3.3 | 2.3 | 7.59 | 1.73 | 86 |
| After plating | FIG. 7 | 3.1 | 1.5 | 4.65 | 1.1 | 85.6 |

Even though the cross-sectional area of a plated mesh pattern is smaller than the cross-sectional area of a non-plated mesh pattern, the sheet resistance is low by about 63%. This shows that the resistance of the plating layer is much lower than the resistance of the metal layer formed of ink, which derives the effect of lowering the overall sheet resistance value.

Figure 13A:
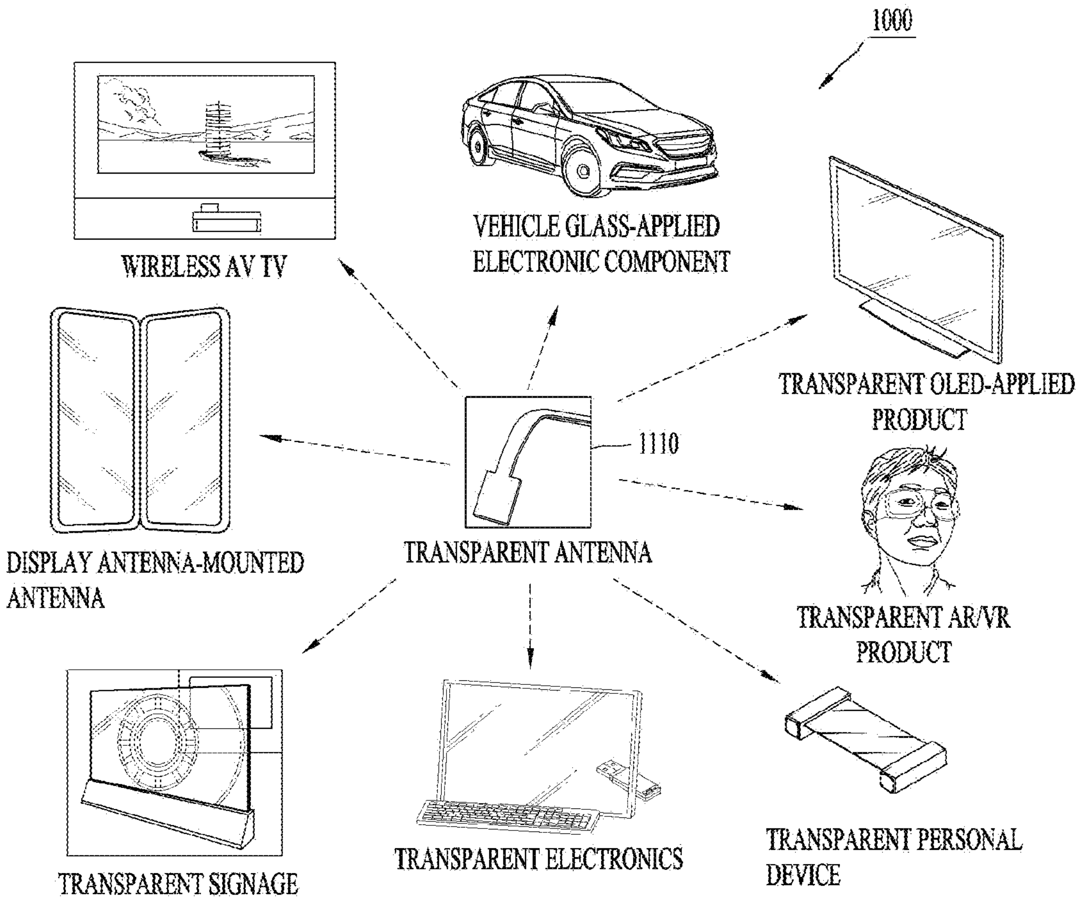
FIGS. 13A and 13B are views illustrating electronic devices in which a transparent antenna module according to the present disclosure may be implemented.
Figure 13B:
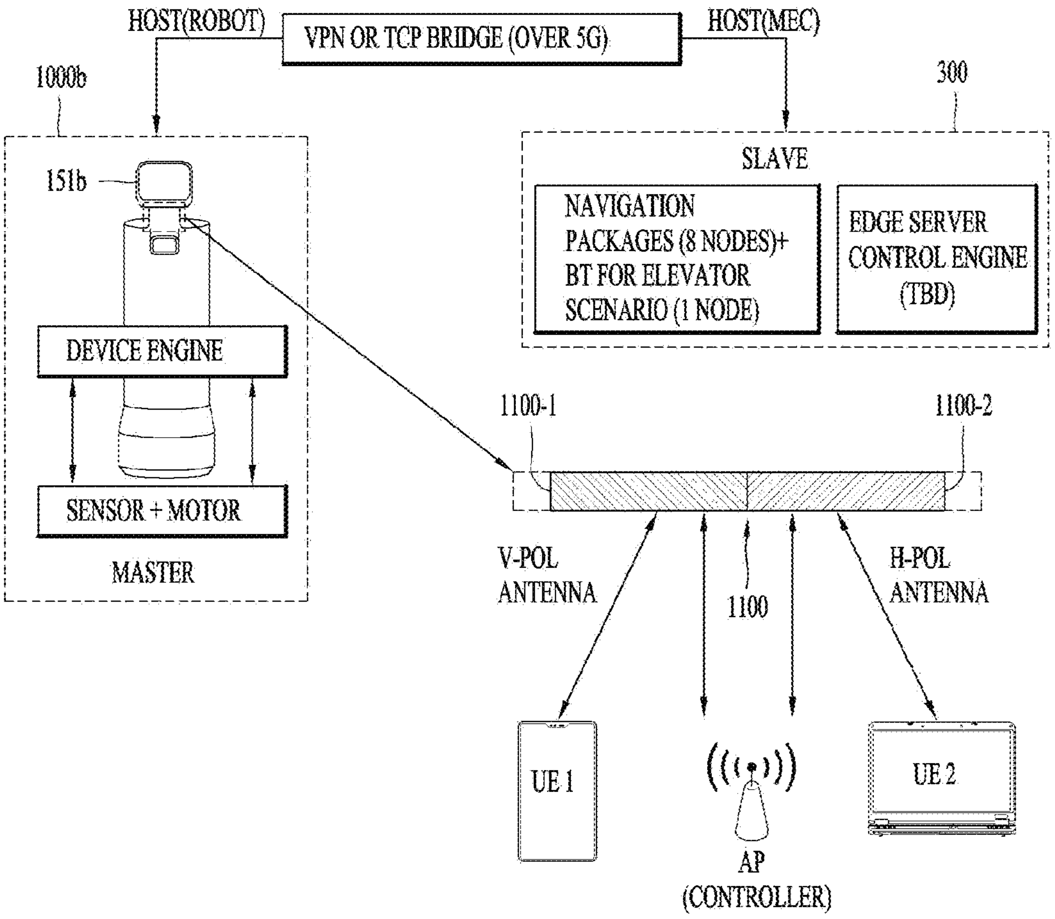

Meanwhile, the transparent metal mesh pattern constituting the transparent antenna module disclosed herein may be implemented in displays of various electronic devices. In this regard, FIGS. 13A and 13B are views illustrating electronic devices in which a transparent antenna module according to the present disclosure may be implemented.

The transparent antenna module implemented in the display disclosed herein may be applied to various electronic devices. In this regard, FIG. 13A illustrates an example in which the transparent antenna module 1100 disclosed herein is applied to various electronic devices 1000. Referring to FIGS. 1 to 13A, the electronic device 1000 may be at least one of a mobile terminal, a signage, a display device, a transparent AR/VR device, a vehicle, or a wireless audio/video device. Meanwhile, a first antenna module and a second antenna module constituting the transparent antenna module may be disposed in the upper region, lower region, or side region of the electronic device 100. For example, the antenna element 1110 operating in vertical/horizontal polarization may be disposed in various forms on the display of the electronic device or vehicle.

The communication network may be implemented with a VPN or TCP bridge. The robot 1000*b* may access an MEC server 300 through the communication network. Since the robot 1000*b* interoperates with the MEC server 300, the robot/network system may be referred to as a cloud robotics system. The cloud robotics system is a system in which functions necessary for the robot 1000*b* to perform a given mission are processed by a cloud server such as the MEC server 300.

Referring to FIGS. 1 to 13B, the transparent antenna module may be configured such that the transparent metal mesh pattern is disposed on or in the display of the mobile terminal, the display device, or the robot or on or in the glass of a vehicle, to radiate a wireless signal.

The foregoing description has been given of the transparent antenna module according to one aspect of the present disclosure. Hereinafter, a method for manufacturing a transparent antenna module according to another aspect will be described. In this regard, all technical features described in relation to the transparent antenna module may also be applied to a method for manufacturing a transparent antenna module to be explained below.

Figure 14:
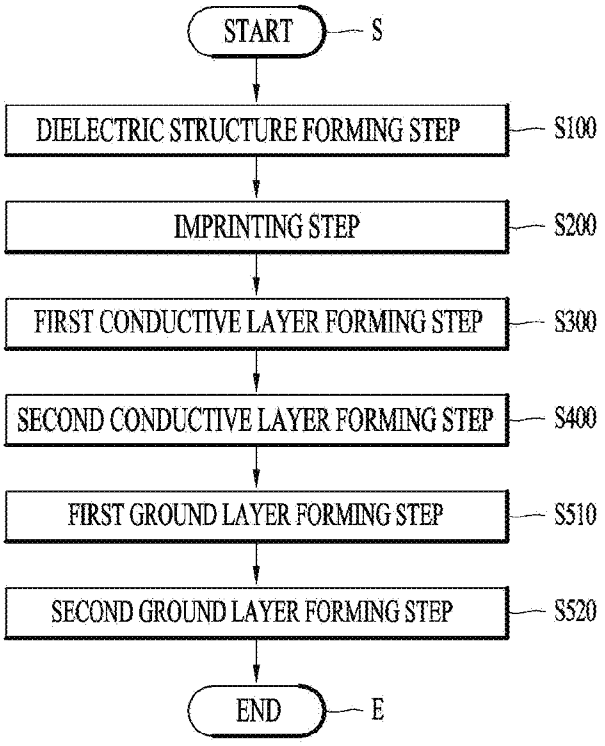
FIG. 14 is a flowchart illustrating a method for manufacturing a transparent antenna module in accordance with the present disclosure.

FIG. 14 is a flowchart illustrating a method for manufacturing a transparent antenna module in accordance with the present disclosure. Referring to FIGS. 2 and 14, a method for manufacturing a transparent antenna module may include a dielectric structure forming step (S100), an imprinting step (S200), a first conductive layer forming step (S300), and a second conductive layer forming step (S400).

The transparent antenna module manufacturing method begins (S). In the dielectric structure forming step (S100), a dielectric structure may be formed in contact with an upper portion of a dielectric substrate.

In the imprinting step (S200), the dielectric structures may be formed using an imprint mold to be spaced apart from each other by a gap region of a predetermined spacing in at least one axial direction.

In the first conductive layer forming step (S300), a first conductive layer may be formed to be in contact with the second dielectric substrate in the gap region to have a first thickness (first height). Additionally, in the second conductive layer forming step (S400), a second conductive layer may be formed to be in contact with an upper portion of the first conductive layer to have a second thickness.

Through the first conductive layer forming step (S300) and the second conductive layer forming step (S400), an antenna element that is formed as a transparent metal mesh pattern in at least one axial direction may be formed. Specifically, in the first conductive layer forming step (S300), the first conductive layer may be formed by printing metal ink or metal paste in the gap region at a first height lower than a height of the dielectric structure. In the second conductive layer forming step (S400), the second conductive layer may be formed by a second height through a plating process on the printed metal ink or metal paste of the first conductive layer. The second conductive layer may operate as a main connection path for wireless signals radiated through the antenna element.

According to an embodiment, in the dielectric structure forming step (S100), the dielectric structure may be formed to be inclined at an angle of 45 degrees or less with respect to a vertical axis, so that the width of the gap region decreases as it is adjacent to the dielectric substrate. In the first conductive layer forming step (S300), the first conductive layer may also be formed in a hexahedral shape with an inverted trapezoidal cross-sectional area such that the area of an upper region is larger than the area of a lower region. In the second conductive layer forming step (S400), the second conductive layer may also be formed in a hexahedral shape with an inverted trapezoidal cross-sectional area such that the area of an upper region is larger than the area of a lower region.

According to an embodiment, in the dielectric structure forming step (S100), the height of the dielectric structure may be formed to be greater than the width of the gap region of the dielectric structure. Accordingly, in the second conductive layer forming step (S400), the second height of the second conductive layer may be greater than the width of the second conductive layer, thereby increasing transmittance of the antenna element formed as the transparent metal mesh pattern and reducing sheet resistance.

Additionally, the transparent antenna module manufacturing method disclosed herein may be applied to both an antenna layer and a ground layer. In this regard, a predetermined step may be performed after the second conductive layer forming step (S400) in a structure in which the antenna layer and the ground layer share the same dielectric substrate. In other words, a first ground layer forming step (S510) and a second ground layer forming step (S520) may be further performed after the second conductive layer forming step (S400).

In relation to this, in the imprinting step (S200), an imprinting operation may be performed to create gap regions on the front and rear surfaces of the dielectric substrate. The spacing and intersection point of the metal mesh grids to be formed on the front and rear surfaces of the dielectric substrate may be different. In the first ground layer forming step (S510), a first ground layer (first conductive layer) may be formed at a first height in contact with the dielectric substrate in a gap region formed on the rear surface of the dielectric substrate. In the second ground layer forming step (S510), a second ground layer (second conductive layer) may be formed at a second height in contact with the first ground layer in the gap region formed on the rear surface.

Figure 15:
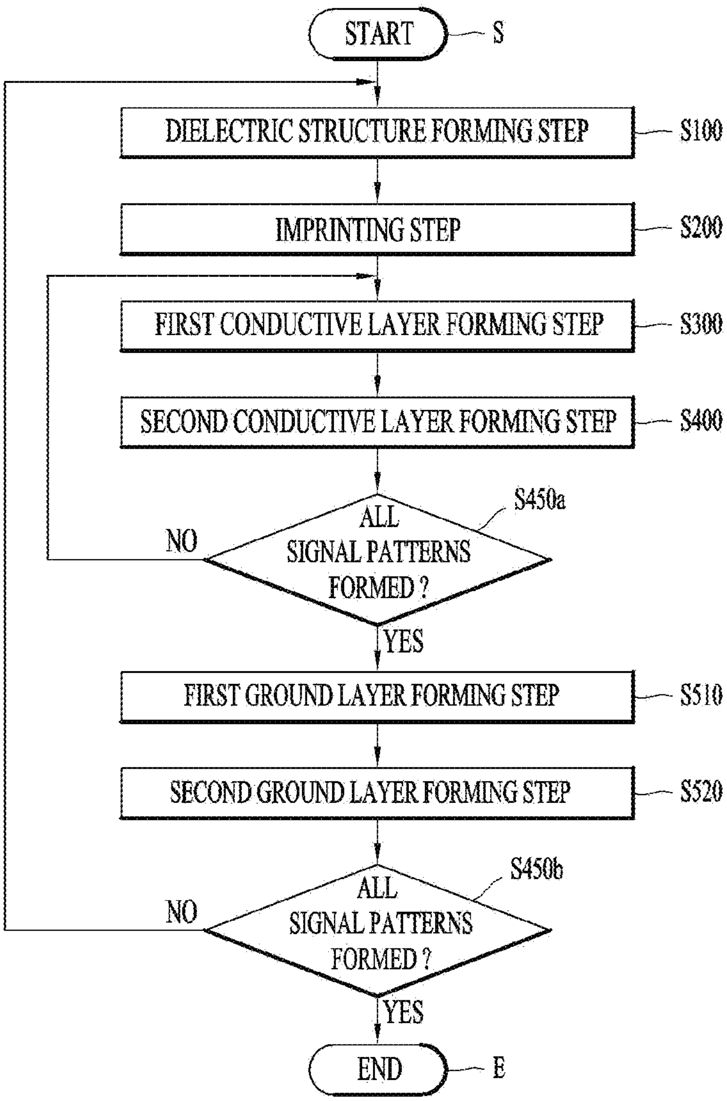
FIG. 15 is a flowchart illustrating a method for manufacturing a transparent antenna module with a multi-layer structure in accordance with the present disclosure.

Additionally, the transparent antenna module manufacturing method disclosed herein may be applied to a multi-layer structure in which a feed line is formed below the ground layer, in addition to the antenna layer and the ground layer. In this regard, FIG. 15 is a flowchart illustrating a method for manufacturing a transparent antenna module of a multi-layered structure in accordance with the present disclosure. Referring to FIGS. 2, 14, and 15, the method for manufacturing the transparent antenna module includes the dielectric structure forming step (S100), the imprinting step (S200), the first conductive layer forming step (S300), the second conductive layer forming step (S400), the first ground layer forming step (S510), and the second ground layer forming step (S520).

After the second conductive layer forming step (S400), it may be determined whether all signal patterns have been formed (S450). In this regard, the first conductive layer forming step (S300) and the second conductive layer forming step (S400) may be repetitively performed in a second region where the feed line is to be disposed, after forming the first and second conductive layers in a first region where the antenna element is disposed.

Meanwhile, in the first ground layer forming step (S510) and the second ground layer forming step (S520), a slot region may be formed to be coupled to the feed line. Meanwhile, after the second ground layer forming step (S520), the dielectric structure forming step (S100), the imprinting step (S200), the first conductive layer forming step (S300), and the second conductive layer forming step (S300) may be repetitively performed to implement the feed line on the dielectric substrate.

In this regard, in the dielectric structure forming step (S100), the dielectric structure may be formed in contact with one surface of a second dielectric substrate. In the imprinting step (S200), the dielectric structures may be formed using an imprint mold to be spaced apart from each other by a gap region of a predetermined spacing in at least one axial direction.

In the first conductive layer forming step (S300), a first conductive layer may be formed in the gap region to be in contact with the second dielectric substrate to have a first thickness (first height). Additionally, in the second conductive layer forming step (S400), a second conductive layer may be formed to be in contact with an upper portion of the first conductive layer to have a second thickness (second height).

After the second conductive layer forming step (S400) or the second ground layer forming step (S520), it is determined whether all signal patterns, including the antenna element and the feed line, have been formed (S450, 450*b*). When it is determined that there are signal patterns remaining, which are to be formed on the same layer as the layer on which the antenna element is disposed (S450), the first conductive layer forming step (S300) and the second conductive layer forming step (S400) may be repeatedly performed.

When the antenna element and the feed line are formed on the same layer as illustrated in FIGS. 8 and 9, the first conductive layer forming step (S300) and the second conductive layer forming step (S400) may be performed again for the feed line. In this regard, the antenna elements may be configured to have mesh grids formed at first and second spacings and the feed lines may be configured to have mesh grids formed at third and fourth spacings. For this purpose, the feed line may be formed using a dielectric mold by which the mesh grids can be formed at the third and fourth spacings.

On the other hand, when it is determined that there are signal patterns remaining, which are to be formed on a layer different from the layer on which the antenna element is disposed (S450*b*), the procedure from the dielectric structure forming step (S100) to the second conductive layer forming step (S400) may be repetitively performed. On the other hand, when it is determined that all signal patterns, including the antenna element and the feed line, have been formed (S450*b*), the transparent antenna module manufacturing method ends (E).

So far, the transparent antenna module and the method for manufacturing the same according to the present disclosure have been described. Hereinafter, technical effects of the transparent antenna module and the method for manufacturing the same according to the present disclosure will be described.

According to the present disclosure, a transparent antenna module mounted on a display, and a method for manufacturing the same can be provided.

According to the present disclosure, an imprinting method and a metal mesh structure that lower a sheet resistance value during a metal mesh manufacturing process by an imprinting process can be provided.

According to the present disclosure, an antenna radiator can be implemented as a transparent antenna module with a metal mesh structure according to an imprinting process that lowers a sheet resistance value.

According to the present disclosure, desired sheet resistance value and transparency can be achieved by considering resistivity of an electrode material to be used, a line width of a mesh pattern, a thickness of a mesh pattern, a spacing between patterns, and the like.

According to the present disclosure, a transparent antenna module that maintains transparency while improving conductivity can be implemented.

According to the present disclosure, a metal mesh structure that is capable of maintaining or improving antenna characteristics while improving transparency and visibility in a metal mesh line structure can be provided.

Further scope of applicability of the present disclosure will become apparent from the following detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

In relation to the present disclosure, the transparent antenna module and the method for manufacturing the same can be implemented as computer-readable codes in a program-recorded medium. The computer-readable medium may include all types of recording devices each storing data readable by a computer system. Examples of such computer-readable media may include hard disk drive (HDD), solid status disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described embodiments are not limited by any of the details of the foregoing description, unless otherwise specified, but rather should be construed broadly within its scope as defined in the appended claims, The scope of the invention should be determined by reasonable interpretation of the appended claims and all changes that come within the equivalent scope of the invention are included in the scope of the disclosure.

The invention claimed is:

1. A transparent antenna module comprising:

a dielectric substrate;

dielectric structures that are formed in contact with an upper portion of the dielectric substrate and respectively spaced apart from each other by a gap region in at least one axial direction;

a first conductive layer that is formed in the gap region to be in contact with the dielectric substrate and formed to have a first thickness; and a second conductive layer that is formed to be in contact with an upper portion of the first conductive layer and formed to have a second thickness;

a first ground layer formed in a first rear gap region formed on a rear surface of the dielectric substrate to be in contact with the dielectric substrate; and a second ground layer formed in the first rear gap region to be in contact with the first ground layer, wherein the first conductive layer and the second conductive layer are included in a transparent metal mesh pattern that is formed in at least one axial direction and is configured to radiate wireless signals.

2. The transparent antenna module of claim 1, wherein the dielectric structures are made of UV resin disposed in contact with the upper portion of the dielectric substrate, and are formed based on stamping of an imprint mold.

3. The transparent antenna module of claim 1, wherein the first conductive layer is formed based on a printed metal ink or metal paste in the gap region to have the first thickness which is smaller than a height of the dielectric structure.

4. The transparent antenna module of claim 3, wherein the second conductive layer is formed on the printed metal ink or metal paste of the first conductive layer based on a plating process to have the second thickness, and wherein the second conductive layer is a main connection path for radiating the wireless signals.

5. The transparent antenna module of claim 1, wherein a difference between a total thickness corresponding to a sum of the first thickness and the second thickness, and a height of an adjacent dielectric structure, is within a predetermined range.

6. The transparent antenna module of claim 1, wherein the second thickness of the second conductive layer is thicker than the first thickness of the first conductive layer.

7. The transparent antenna module of claim 1, wherein opposing side surfaces of adjacent dielectric structures are inclined at an angle of 45 degrees or less with respect to a vertical axis, so that a width of the gap region decreases toward the dielectric substrate.

8. The transparent antenna module of claim 7, wherein a cross-section of the first conductive layer has an inverted trapezoidal shape such that an area of an upper surface thereof is larger than an area of a lower surface thereof, and wherein a cross-section of the second conductive layer has an inverted trapezoidal cross-sectional shape such that an area of an upper surface thereof is larger than an area of a lower surface thereof.

9. The transparent antenna module of claim 1, wherein a height of the dielectric structures is greater than a width of the gap region.

10. The transparent antenna module of claim 9, wherein the first thickness of the first conductive layer is greater than a width of the first conductive layer.

11. The transparent antenna module of claim 1, wherein the first conductive layer comprises volatized organic components of metal ink or metal paste through heat treatment, and the dielectric structure comprises photocurable resin configured to withstand damage from the heat treatment.

12. The transparent antenna module of claim 1, wherein the second conductive layer is formed on the first conductive layer through plating, and a metal content of the second conductive layer is higher than a metal content of the first conductive layer so that conductivity of the second conductive layer is higher than conductivity of the first conductive layer.

13. The transparent antenna module of claim 1, further comprising an antenna element configured by the transparent metal mesh pattern, and wherein a length of the antenna element is ½ to ¼ of an operating wavelength corresponding to an operating frequency of the antenna element.

14. The transparent antenna module of claim 13, further comprising a feed line that is configured to be connected to the antenna element to apply the signals to be wirelessly radiated, wherein the feed line and the antenna element are configured as metal mesh patterns each including respective first conductive layers and second conductive layers, and wherein first and second spacings between metal mesh lines extending in first and second axial directions, respectively, of the metal mesh patterns of the feed line and the antenna element, are respectively the same.

15. The transparent antenna module of claim 14, further comprising a terminal part configured to be connected to the feed line, wherein a line width of a metal mesh pattern of the terminal part is wider than a line width of the metal mesh pattern of the antenna element, and wherein a third spacing and a fourth spacing between metal mesh lines extending in the first and second axial directions, respectively, of the metal mesh pattern of the terminal part are respectively narrower than the first spacing and the second spacing of the metal mesh pattern of the antenna element.

16. A method for manufacturing a transparent antenna module, the method comprising:

providing a dielectric material to be in contact with an upper portion of a dielectric substrate;

forming dielectric structures using an imprint mold applied to the dielectric material, wherein the dielectric structures are respectively spaced apart from each other by a gap region in at least one axial direction;

forming a first conductive layer in the gap region to be in contact with the dielectric substrate and to have a first thickness;

forming a second conductive layer to be in contact with an upper portion of the first conductive layer and to have a second thickness;

forming rear dielectric structures at a rear of the dielectric substrate, wherein the rear dielectric structures are respectively spaced apart from each other by a first rear gap region, forming a first ground layer in the first rear gap region to be in contact with the dielectric substrate; and forming a second ground layer in the first rear gap region to be in contact with the first ground layer, wherein the first conductive layer and the second conductive layer are included in a transparent metal mesh pattern that is formed in at least one axial direction and is configured to radiate wireless signals.

17. The method of claim 16, wherein forming the first conductive layer comprises printing metal ink or metal paste in the gap region to have the first thickness smaller than a height of the dielectric structure, wherein forming the second conductive layer comprises plating the second conductive layer to have the second thickness on the printed metal ink or metal paste of the first conductive layer through a plating process, and wherein the second conductive layer is a main connection path for radiating the wireless signals.

18. The method of claim 16, wherein the dielectric structures are formed such that opposing side surfaces of adjacent dielectric structures are inclined at an angle of 45 degrees or less with respect to a vertical axis, so that a width of the gap region decreases toward the dielectric substrate, wherein the first conductive layer is formed such that a cross-section of the first conductive layer has an inverted trapezoidal shape such that an area of an upper surface thereof is larger than an area of a lower surface thereof, and wherein the second conductive layer is formed such that a cross-section of the second conductive layer has an inverted trapezoidal shape such that an area of an upper surface thereof is larger than an area of a lower surface thereof.

* * * * *